United States Patent [19]

Osburn

[11] 4,272,216
[45] Jun. 9, 1981

[54] MACHINE TOOL LUBRICATION SYSTEM

[75] Inventor: John G. Osburn, Milwaukee, Wis.

[73] Assignee: Kearney & Trecker Corporation, West Allis, Wis.

[21] Appl. No.: 971,351

[22] Filed: Dec. 20, 1978

[51] Int. Cl.³ .............................................. B23Q 4/12
[52] U.S. Cl. .................................. 409/132; 184/6.14; 308/5 R; 409/219; 409/904
[58] Field of Search ................ 184/1 E, 6.1, 6.3, 6.14; 409/219, 221, 224, 225, 904, 132; 308/5 R

[56] References Cited

U.S. PATENT DOCUMENTS

| | | | |
|---|---|---|---|
| 2,682,203 | 6/1954 | Senn | 184/6.1 |
| 2,719,065 | 9/1955 | Hornbostel | 184/6.3 X |
| 3,231,320 | 1/1966 | Krafft | 308/5 R |
| 3,856,114 | 12/1974 | Zankl | 184/6.1 |

*Primary Examiner*—Z. R. Bilinsky
*Attorney, Agent, or Firm*—Cyril M. Hajewski

[57] ABSTRACT

The control valve for a hydrostatic bearing on a machine tool slide is opened when motion is commanded along the corresponding machine tool axis to eliminate sticking at the start of motion. The valve is closed when the velocity of motion exceeds a predetermined level and is opened again when the velocity drops below the predetermined value to eliminate sticking at the end of motion. The valve is closed again when the machine tool slide arrives at its commanded position.

5 Claims, 5 Drawing Figures

MACHINE TOOL LUBRICATION SYSTEM

BACKGROUND OF THE INVENTION

This invention relates to bearings for machine tool slides. In the past, either roller bearings or hydrodynamic bearings or a combination of both have been used on the slides of machine tools. Hydrodynamic bearings include a bearing pad and a runner along with means for introducing a lubricant between the pad and runner. Hydrodynamic bearings require relative motion between the bearing pad and runner to generate forces in the lubricant between the pad and runner. At zero speed, the lubricant is squeezed out from between the pad and the runner and direct contact is made between the pad and runner. Thereafter, when an initial starting force is applied to the slide, it will stick due to the relatively high static friction between the pad and runner. To start the slide moving, the starting force must be increased to a level which will overcome the static friction, but since the static friction is greater than the dynamic friction, this results in a jerky start. The jerky start characteristic is particularly troublesome when the slide is approaching its commanded position. If the slide stops somewhat short of the commanded position, the servo system has to build up enough force to overcome the static friction, which causes a jerky start that may carry the slide past the commanded position. In the extreme case, the slide may oscillate about the commanded position, forever trying to reach the commanded position, but always overshooting due to the jerky start characteristic.

Hydrostatic bearings include a bearing pad and a runner with a recess in either the pad or runner. Hydrostatic bearings have also been used in machine tools to lubricate slowly moving parts. In hydrostatic bearings, the lubricant is pumped into the recess between the bearing pad and runner with sufficient pressure to keep the pad and runner separated with no relative motion therebetween. In the past, however, the hydrostatic bearings were continuously operated and were thus wasteful of energy and required an expensive sealing system.

The principal object of this invention is to provide a hydrostatic bearing which is adapted for intermittant use in a machine tool to eliminate jerky starting and stopping of the machine tool slides.

Other objects and advantages of the invention will be apparent from the detailed description herein.

SUMMARY OF THE INVENTION

The valve for a hydrostatic bearing on a machine tool slide is opened when motion is commanded along the corresponding machine tool axis and is closed when the velocity of motion exceeds a predetermined level. The valve is opened again when the velocity of motion falls below the predetermined level and is closed again when the slide arrives at its commanded position.

DESCRIPTION OF THE PREFERRED EMBODIMENTS

This invention is adapted for use in combination with a computer controlled machine tool such as the MILWAUKEEMATIC 200, manufactured by the Kearney and Trecker Corporation of Milwaukee, Wis.

Figure 1:
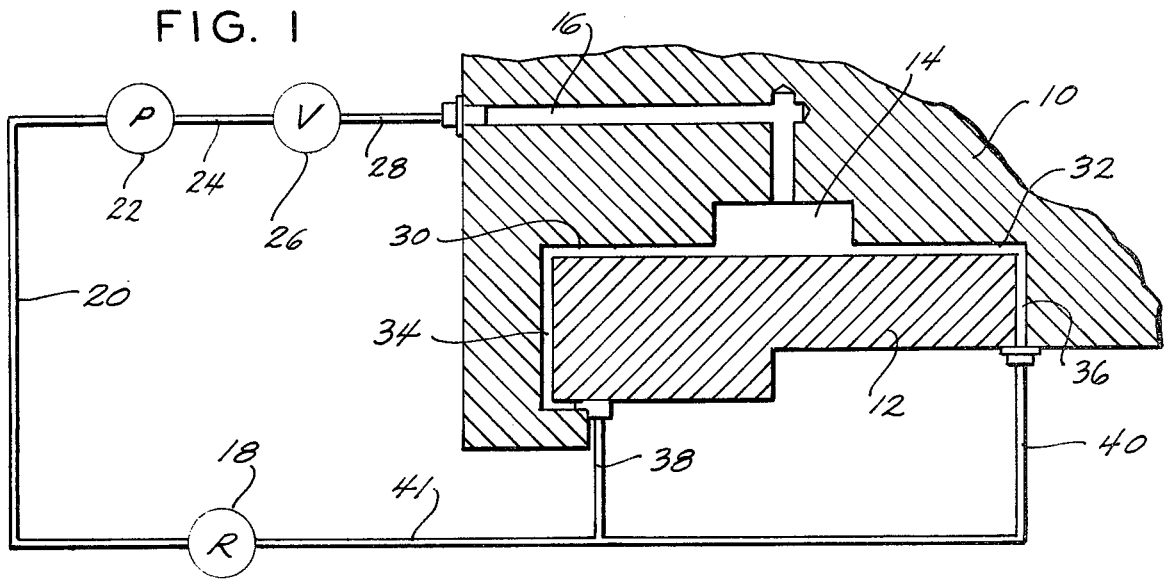
FIG. 1 is a fragmentary cross-sectional view of a machine tool slide with a hydrostatic bearing formed thereon.

In FIG. 1, reference numeral 10 denotes a portion of a machine tool X-axis slide and reference numeral 12 denotes the X-axis way. A hydrostatic bearing recess 14 is formed in slide 10 and is coupled to a source of lubricant under pressure by a duct 16. A lubricant reservoir 18 is coupled via conduit 20 to a pump 22 which is coupled via conduit 24 to a solenoid valve 26. Solenoid valve 26 is coupled via conduit 28 to duct 16. When solenoid valve 26 is opened, lubricant is pumped into recess 14 at sufficient pressure to lift slide 10 off way 12. Lubricant then flows from recess 14 through the adjacent sills 30 and 32 and is then discharged through the clearances 34 and 36 at the side of way 12. The lubricant discharged from the sides of way 12 is collected in troughs (not shown) and is routed to conduits 38 and 40 which are coupled via conduit 41 to lubricant reservoir 18.

Figure 3:
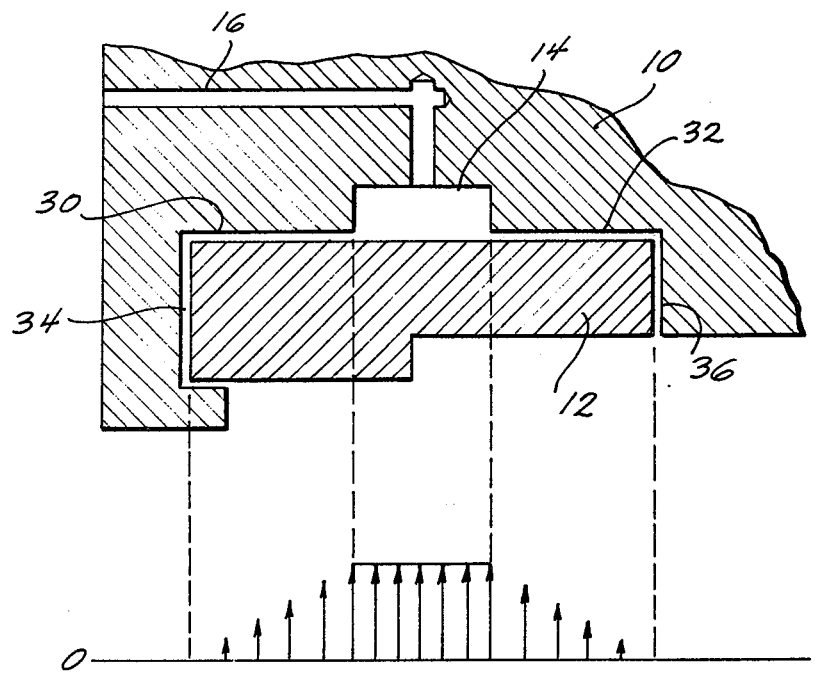
FIG. 3 is an enlarged view of the hydrostatic bearing of FIG. 1 along with a pressure diagram therefor.

FIG. 3 shows the distribution of pressure in the hydrostatic bearing when valve 26 is opened and pump 22 is pumping lubricant into recess 14. The lubricant pressure is at a maximum in recess 14 and drops uniformly from the maximum to a low level at the outer edges of sills 30 and 32. When X-axis slide 10 is moving, the lubricant pressure in sills 30 and 32 is augmented by the hydrodynamic pressure induced by the X-axis motion. Thus, sills 30 and 32 serve both as a hydrostatic bearing sill and as a hydrodynamic bearing and are designed with both functions in mind.

Similar hydrostatic bearings (not shown) are formed on the Y-axis and Z-axis slides. A conventional hydrodynamic bearing (not shown) is provided for each slide to handle lubrication needs when the slides are in motion. A suitable hydrodynamic lubrication system is disclosed in U.S. Pat. No. 3,856,114 which was issued on Dec. 24, 1974 to Frank Zankl for an "Automatic Lubrication System". The hydrostatic bearings of this invention are only used when the slides are moving very slowly.

Figure 2:
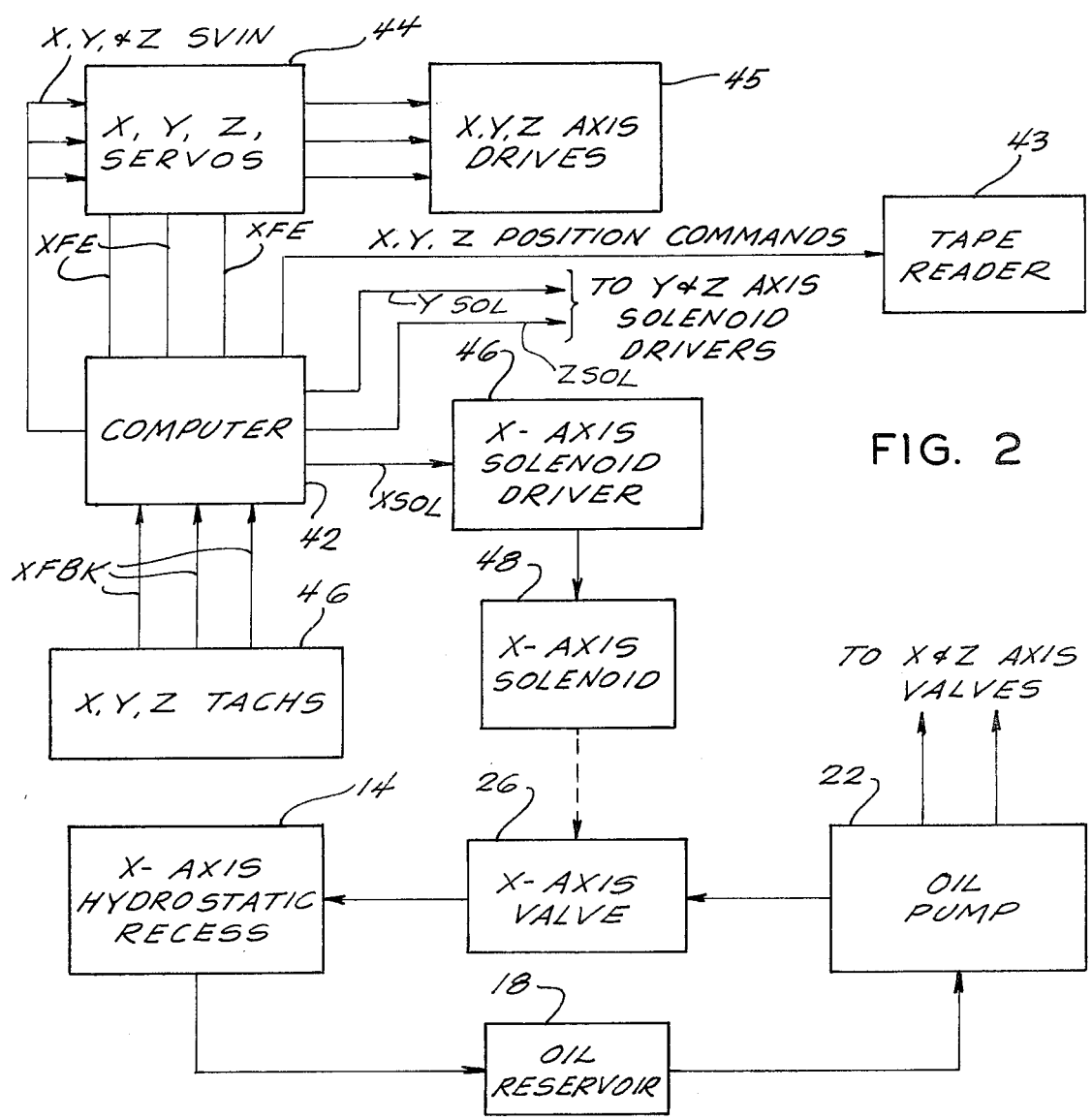
FIG. 2 is a block diagram of the control system for a set of hydrostatic bearings on a machine tool.

The control system for the hydrostatic bearings of this invention is shown in FIG. 2. The machine tool has a conventional computer control circuit which includes conventional X, Y and Z axis drives 45; X, Y and Z servos 44; X, Y and Z tachometers 46; computer 42; and tape reader 43. These circuits are well-known and hence are not disclosed in detail Computer 42 receives inputs XFE, YFE and ZFE from the X, Y and Z servos 44 and receives inputs XFBK, YFBK and ZFBK from the X, Y and z tachometers 46. Computer 42 has outputs XSOL, YSOL and ZSOL to the solenoid valves of the X, Y and Z-axis hydrostatic bearings. Only the X-axis hydrostatic bearing control circuit is shown in FIG. 2, but it will be understood that the Y-axis and Z-axis hydrostatic bearing control circuits are the same as the X-axis hydrostatic bearing control circuit.

Figure 5:
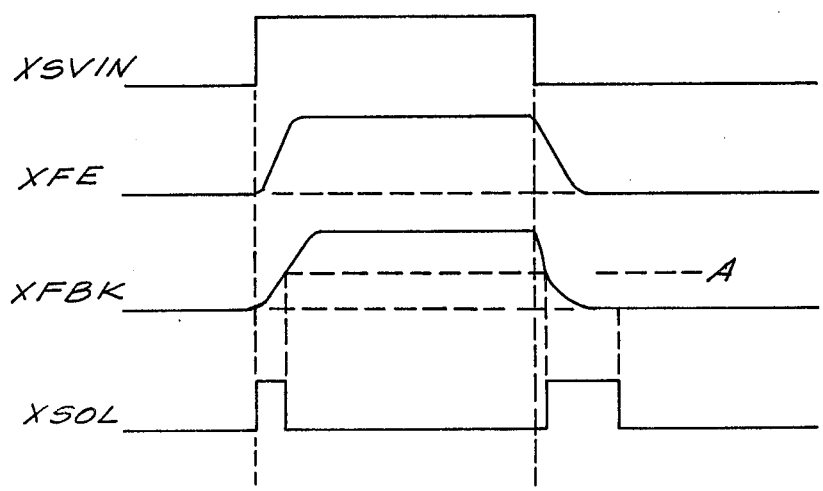
FIG. 5 is a set of waveforms illustrating the relationship between the signals utilized in the flow chart of FIG. 4.
Figure 4:
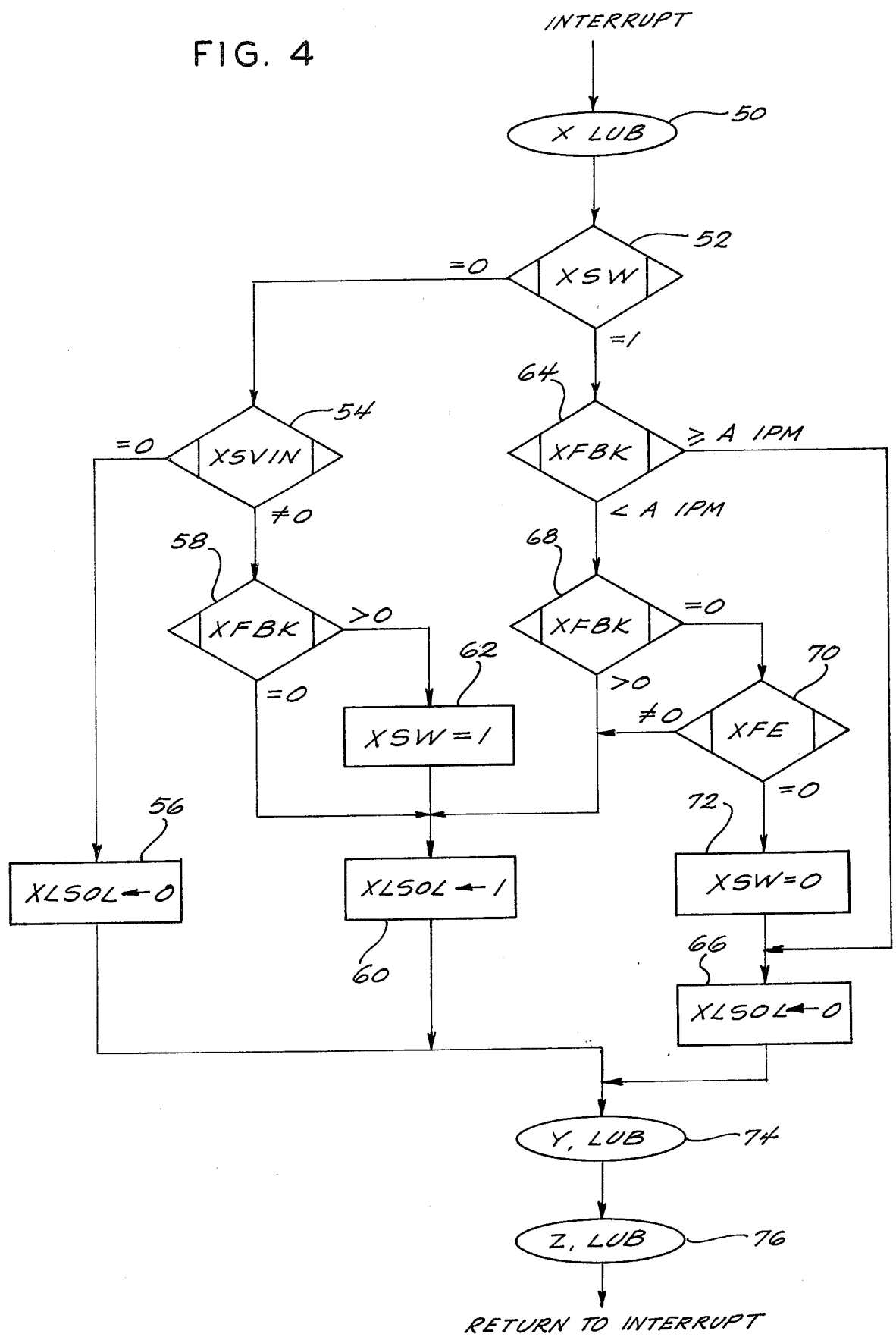
FIG. 4 is a flow chart of a computer program for opening and closing the hydrostatic bearing valves in the control 30 system of FIG. 2.

Computer 42 has an output XSOL which is applied to the X-axis solenoid driver circuit 46 (FIG. 2) which controls X-axis solenoid 48. X-axis solenoid 48 controls the X-axis valve 26 which, in turn, controls the application of lubricant to the X-axis hydrostatic bearing. When valve 26 is closed, the lubricant feed to the hydrostatic bearing is blocked and the bearing is inoperative except for the hydrodynamic bearing action induced by sills 30 and 32 on the residual lubricant film in the bearing. When valve 26 is opened, lubricant is pumped into X-axis hydrostatic recess 14 under sufficient pressure to separate X-axis slide 10 from X-axis way 12 when slide 10 is stationary. Valve 26 is turned off and on in accordance with the program routine illustrated in FIGS. 4 and 5. FIG. 4 is a flow chart of the program routine and FIG. 5 is a set of waveforms for the signals referred to in FIG. 4. The program routine will be described in a step-by-step sequence, beginning with the interrupt signal which occurs periodically every 8.3 milliseconds and forms the basic computational period for all of the machine tool functions.

The X-axis lubrication routine is entered by means of a step 50 which receives control from the executive routine of the computer and passes control to step 52. Step 52 determines whether XSW (a software switch) is in the 0 or 1 state. XSW is initially in the 0 state, which causes control to pass from step 52 to step 54. Step 54 determines whether the signal XSVIN is equal to zero or not equal to zero. XSVIN is a signal generated in computer 42 which commands the X-axis servo system to move X-axis slide 10 toward a commanded position. XSVIN is derived from tape reader 43 or from manual input commands which commands the X-axis slide 10 to move to a commanded position. When XSVIN is equal to zero, step 54 passes control to step 56 which turns the X-axis solenoid 48 (XLSOL) off and closes X-axis valve 26. When XSVIN is not equal to zero, i.e. when an X-axis move has been commanded, step 54 passes control to step 58 which determines whether the signal XFBK (feedback for the X-axis servo system) is equal to zero or greater than zero. If XFBK is zero, step 58 passes control to step 60, which turns the X-axis solenoid 48 (XSOL) on and opens X-axis valve 26. If XFBK is greater than zero, which means that X-axis slide 10 is in motion, step 58 passes control to step 62 which sets software switch XSW to 1 then passes control to step 60.

The foregoing steps 54 to 62 serve to open X-axis valve 26 as soon as movement of the X-axis slide 10 is commanded. Note that the X-axis valve 26 opens as soon as the movement is commanded without waiting for the movement to commence. This insures that the hydrostatic bearing will be operative at the time that movement commences and will thus eliminate sticking at the start of movement.

In the next computing cycle, control will pass from step 52 to step 64 since software switch XSW is now in the 1 state. Step 64 determines whether the value of XFBK (X-axis servo feedback) indicates a velocity of greater than or less than A inches per minute, where A is the velocity at which the hydrodynamic bearings are effective and hydrostatic bearings are no longer required. If XFBK is greater than A inches per minute, control passes from step 64 to step 66 which turns the X-axis solenoid 48 (XSOL) off and closes X-axis valve 26. If XFBK is less than A inches per minute, control passes from step 64 to step 68 which determines whether or not XFBK is equal to zero. If XFBK is greater than zero, control passes from step 68 to step 60 and the X-axis solenoid 48 (XSOL) remains on. If XFBK is equal to zero, control passes from step 68 to step 70 which determines whether the signal XFE (following error) is equal to or not equal to zero. The signal XFE is proportional to the difference between the actual position of X-axis slide 10 and the commanded position thereof. When XFE falls to zero, the X-axis slide 10 is at the commanded position. When XFE is not equal to zero, control passes from step 70 to step 60 and the X-axis solenoid 48 (XSOL) remains on. When XFE is equal to zero, control passes from step 70 to step 72 which sets XSW back to zero and then to step 66 which turns the X-axis solenoid 48 (XSOL) off.

After the condition of the X-axis solenoid 48 (XSOL) has been determined on steps 56, 60 or 66, control passes to a Y-axis lubrication routine 74 which is the same as the above-described X-axis lubrication routine. At the end of the Y-axis lubrication, control passes to a Z-axis lubrication routine 76 which is also the same as the above-described X-axis lubrication routine.

The effect of the above-described routine is to open the corresponding hydrostatic bearing valve when movement of the slide is commanded or when the velocity of the slide falls below the predetermined value A, and to close the corresponding hydrostatic bearing valve when the velocity of the slide rises above the predetermined value A or when the slide reaches its commanded position. Thus, the hydrostatic bearing is only used when the slide is about to move or is approaching its commanded position.

The lubrication routine illustrated in the flow chart of FIG. 4 is implemented in the following program listing, which is written for use with a PDP-8 computer manufactured by Digital Equipment Corporation of Maynard, Mass. The program listing is in machine language.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

lubricant thereto, a source of lubricant under pressure, means for admitting lubricant from said source to said ways so that a film of lubricant is on the ways when movement of said slide is initiated, velocity responsive control means operating to terminate the flow of lubricant to said ways when said slide accelerates to a predetermined velocity and to restore the flow of lubricant to said ways when said slide decelerates to a predetermined velocity so that the slide is smoothly accelerated to desired velocity and is smoothly decelerated to a stop after completing its designated movement.

```
  1                        ***** X AXIS LUBRICATION PROGRAM *****
  2                      /
  3                      /
  4       00200  7400  XLUB, NOP
  5       00201  1240        TAD XSW
  6       00202  7650        SNA CLA                /XSW=0?
  7       00203  5222        JMP XL1                *
  8       00204  1235        TAD XFBK               /XSW=1; DECELERATION
  9       00205  7510        SPA
 10       00206  7041        CIA                    /ABS XFBK
 11       00207  1236        TAD A
 12       00210  7700        SMA CLA
 13       00211  5233        JMP XL2+1              /XFBK>A IPM, TURN OFF SOL.
 14       00212  1235        TAD XFBK
 15       00213  7640        SZA CLA
 16       00214  5232        JMP XL2                /XFBK<A IPM, BUT > 0, TURN ON SOL.
 17       00215  1237        TAD XFE                /XFBK=0
 18       00216  7640        SZA CLA
 19       00217  5232        JMP XL2                /XFE NOT 0, TURN ON SOL.
 20       00220  3240        DCA XSW                /XFE=0, SET XSW=0
 21       00221  5233        JMP XL2+1              /TURN OFF SOL.
 22                        /
 23       00222  1241  XL1, TAD XSVIN                /XSW=0; ACCELERATION
 24       00223  7650        SNA CLA
 25       00224  5233        JMP XL2+1              /XSVIN=0, TURN OFF SOL
 26       00225  1235        TAD XFBK               /XSVIN NOT 0, DO FBK CHECK
 27       00226  7650        SNA CLA
 28       00227  5232        JMP XL2                /XFBK=0, TURN ON SOL.
 29       00230  7001        IAC                    /XFBK NO 0, SET XSW=1, TURN ON SOL.
 30       00231  3240        DCA XSW
 31       00232  7001  XL2, IAC
 32       00233  3242        DCA XLSOL
 33       00234  5600        JMP I XLUB
 34       00235  0000  XFBK, 0
 35       00236  7300  A,    7300
 36       00237  0000  XFE,  0
 37       00240  0000  XSW,  0
 38       00241  0000  XSVIN, 0
 39       00242  0000  XLSOL, 0
 40                        /
 41                        /
 42                        $

*** A ERRORS ******************

XLUB   00200 1     XL1   00222 1    XL2   00232 6    XFBK  00235 3    A    00236 1    XFE  00237 1
XSW    00240 1     XSVIN 00241 1    XLSOL 00242 1
```

1. A method of lubricating a bearing on a machine tool slide, said machine tool including means for commanding motion of said slide toward a predetermined position, and means for applying a lubricant under pressure to said bearing, said method comprising the steps of applying a lubricant under pressure to said bearing when motion of said slide is commanded, reducing the pressure of said lubricant applied to said bearing when the velocity of said slide is accelerated to a predetermined value, increasing the pressure of said lubricant applied to said bearing when the velocity of said slide is decelerated to a predetermined value, and reducing the pressure of said lubricant to said bearing when said slide arrives at its commanded position so that the acceleration and deceleration of said slide occurs in a smooth and uniform manner.

2. The method of claim 1, wherein said lubricant is applied to said bearing with sufficient pressure to shift said slide out of engagement with said bearing so that it slides on a film of oil.

3. In a lubricating system for lubricating the ways of a machine tool slide, passages in said ways for admitting 4. A lubricating system according to claim 3, wherein said control means terminates the flow of lubricant to said ways when said slide stops its movement after completing its designated path of travel.

5. A lubricating system according to claims 3 or 4, wherein said source of lubricant includes a pump for pumping the lubricant to said ways with sufficient pressure to shift the machine tool slide and move its way surface out of engagement with its cooperating way surface so that the slide moves on a film of oil, and a valve regulating the flow of pressure from said pump to said ways, said valve being operated by said control means.

* * * * *